Oct. 28, 1958  J. DE SWART  2,858,247
PANEL MATERIAL
Filed Aug. 4, 1955  4 Sheets-Sheet 1

INVENTOR.
JAN DE SWART
BY
Christie, Parker & Hale
ATTORNEYS

Oct. 28, 1958    J. DE SWART    2,858,247
PANEL MATERIAL

Filed Aug. 4, 1955    4 Sheets-Sheet 2

INVENTOR.
JAN DE SWART
BY
Christie, Parker & Hale
ATTORNEYS

Oct. 28, 1958 J. DE SWART 2,858,247
PANEL MATERIAL
Filed Aug. 4, 1955 4 Sheets-Sheet 3

INVENTOR.
JAN DE SWART
BY
Christie, Parker & Hale
ATTORNEYS

Oct. 28, 1958

J. DE SWART 2,858,247

PANEL MATERIAL

Filed Aug. 4, 1955

INVENTOR.
JAN DE SWART

BY

Christie, Parker & Hale
ATTORNEYS

United States Patent Office 2,858,247
Patented Oct. 28, 1958

2,858,247

PANEL MATERIAL

Jan de Swart, Los Angeles, Calif., assignor to De Swart Development Company, Los Angeles, Calif., a limited partnership Application August 4, 1955, Serial No. 526,431

4 Claims. (Cl. 154—45.9)

This invention relates to structural materials and more particularly to plastic panels for use in non-structural applications and as cores in laminated or sandwich construction for structural applications.

Modern construction techniques in many fields are turning to laminar or sandwich types of construction in which a core material which is resistant to compressive forces is sandwiched between thin sheets bonded to either face of the core to form a structural material which is strong and lightweight.

While most of the conventional core structures have been strong in compression, achieving tensional, or "beam" strength has posed problems which up to now have been unsolved. Most of the structural cores used to form the inner layer of the laminated structural material have had to be of metallic substances to give any degree of "beam" strength to the structure. Honeycomb material, which is a cellular metallic core structure, has been moderately successful in this use but does not contribute materially toward making the core structure resistant to bending. Also, this material is the end product of a tedious manufacturing process which precludes its use in construction requiring economy. None of the conventional cores can be used alone as panels in new structural situations.

Most of the conventional core materials heretofore available have limited surface for bonding agents because there is little surface common to the core and the outside sheet or skin. For instance, honeycomb core material has only the thin edge of the material forming the honeycomb cells to which the skin may be bonded.

The panel material of the invention is patterned according to a principle which gives a large amount of bonding surface when used as a core, enables plastic materials of thin section and attendant relative economy to be utilized and enables the material to be formed by continuous rolling methods at a fraction of the cost of forming conventional core materials.

The panel of the invention comprises a thin sheet that is embossed to form spaced faces. Each face comprises a multiplicity of projections and each projection has a bearing surface which has at least two contiguous rectilinear areas. The two contiguous rectilinear areas of each bearing surface on each face have diverging major axes which generally extend perpendicularly to each other but need not do so. The bearing surfaces are evenly distributed in each face of the embossed sheet.

The advantage of a pattern of embossing in which the bearing surfaces comprises areas extending in divergent directions is that this enables the patterns to achieve an interlocking configuration in which the projections of the segments of the bearing surfaces in one face of the panel extend between segments of the bearing surfaces in the opposite face of the panel. This type of interlock between the bearing surfaces of one face or of both faces of the panel causes the material itself to be extremely resistant to bending in any direction. This resistance to deformation is an inherent part of the patterning principle of the invention and of itself causes the panel to be more rigid aside from rigidity factors such as the thickness of materials used for the panels or the thickness of the skins used to make a laminated structure with the panel as a core.

Divergency of the major axes of the contiguous areas of the embossed pattern of the bearing surfaces of each face of the panel enables these areas to extend in at least two directions in each face so that bend lines which are inherent in the conventional core materials are precluded by being intersected by flat planar areas regardless of the direction of the supposed bend line.

The panel material of the invention is formed from a single sheet so that embossing results not only in bearing surfaces but in connective projections of material extending between the proximal surfaces of the opposing faces. The walls of the projections resist the compressive forces exerted against the panel and the patterned bearing surfaces resist tensional changes in the panel. The patterns of the bearing surfaces in each face are identical so that the tension forces in each face are equal and therefore there are no warping tendencies within the panel.

Within the contemplation of the invention as recited above is an embodiment which has one degree of interlock between the patterns of a face. One degree of interlock can be defined in terms of the invention as being embodied in a panel which comprises a thin sheet of material embossed to form spaced faces in which each face comprises a multiplicity of projections. The projections each have a bearing surface having at least two contiguous, co-planar rectilinear areas having divergent major axes, the bearing surfaces being evenly distributed in each face of the embossed sheet with their patterns interlocking so that any plane passing through the panel perpendicularly to the panel intercepts more than one bearing surface in one face of the panel.

The invention encompasses a second embodiment in which the structural core has two degrees of interlock. Two degrees of interlock may be defined as embodying a bearing surface pattern in which the interlock is such that any plane passing through the core perpendicular to a face intercepts more than one bearing surface in each face of the core.

In addition to the structural advantages that the interlocking patterns give to the panel material, there is the added advantage of the tremendous decorative enhancing possibilities in the myriad of pleasing patterns possible within the scope of the invention.

Since the panel material of the invention can be fabricated entirely with inexpensive materials such as the polyethylenes, the vinyls or the butyrates, a new field of use for laminated structures is open to builders. The above-named plastics are commercially available in many colors and in a range of light-transmitting qualities varying from clear transparency to complete opaqueness. The structure of the invention is suitable for lighted ceilings, room dividers, partition walls, exterior walls, such as patio screens, and many more like uses.

However, a main advantage of the invention is that its concept of a pattern which in itself lends rigidity as well as compressive strength to a core material is in itself important enough to cause great changes in the field of construction. The core material need not be formed with uniform spacing between the opposing faces of the core. The faces of the forming dies may be contoured to suit the exterior shape of the structural member for which the core is providing rigidiy.

Further advantages of the invention will be apparent from the following detailed specification and drawing, in which.

The panels of the invention are all illustrated as being made from one sheet of a thin plastic material such as polyethylene. Each of the panels has two opposing faces. The faces comprise bearing projections and substantially flat bearing surfaces. The walls of the projections extend between the opposing faces in each of the panels illustrated and, as mentioned above, provide for the resistance in the panel to compressive forces.

Figure 1:
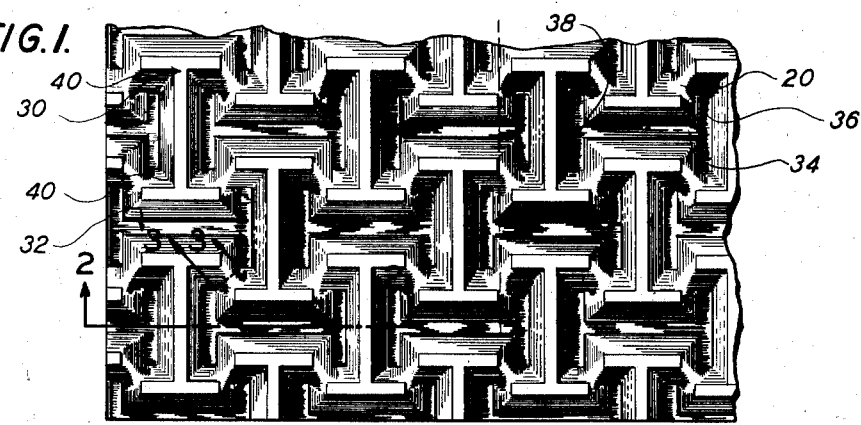
Fig. 1 is a plan view of a panel material embodying the invention and having three contiguous rectilinear areas.
Figure 2:
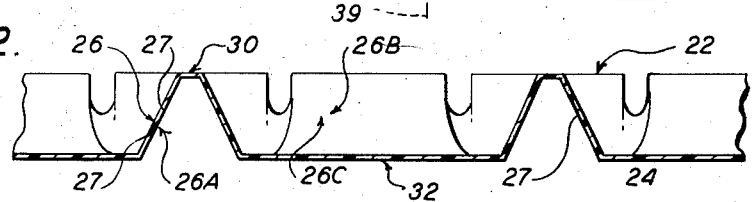
Fig. 2 is a sectional elevation of the panel of Fig. 1, taken along line 2—2 of Fig. 1.
Figure 3:
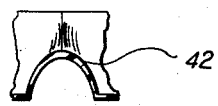
Fig. 3 is an oblique sectional view taken along line 3—3 of Fig. 1 and showing the configuration of a transition area between opposite faces of the panel.

Specifically, the panel illustrated in Figs. 1 through 3 comprises a thin sheet 20 embossed to form opposing faces 22, 24. Each face has a multiplicity of projections such as projections 26, 26A, 26B, 26C of Fig. 2 having projection walls like the walls 27 which extend between upper bearing surfaces 30 and lower bearing surfaces 32.

The typical bearing surface in each face of the panel of Fig. 1 comprises three contiguous co-planar rectilinear areas. Except for their orientation the configuration formed by the three rectilinear areas is the same in each face of the panel. Each bearing surface has a central rectilinear area 34 contiguous with a pair of end rectilinear areas 36, 38. Each of the areas making up the bearing surface is the same width but the central area has a greater longitudinal extent than either end area. The major axes of the end areas of the bearing surface are each perpendicular to the major axis of the central area and the end areas are arranged symmetrically with respect to the major axis of the central area.

The H-shaped bearing surface resulting from the above described arrangement of rectilinear areas are uniformly distributed in each face of the panel. The major axes of the central rectilinear areas of the bearing surfaces in one face, in this instance the bearing surfaces 32, extend horizontally as viewed in Fig. 1, while the major axes of the bearing surfaces 30 in face 22 are oriented so that they extend perpendicularly as viewed in Fig. 1. The above described orientation results in an interlocking pattern in which the end areas of a bearing surface of one face extend normal to the end areas of a bearing surface of the opposing face and parallel and adjacent to the central area of the proximal bearing surface of the opposing face. The interlocking pattern of Fig. 1 therefore has one degree of interlock in that any imaginary line such as line 39 drawn through the face of the panel intercepts a plurality of bearing surfaces in at least one face. The line 38 of Fig. 1 intercepts a plurality of bearing surfaces 32 of face 24. The pattern of Fig. 1 eliminates all inherent bend lines in the panel and no plane may be passed through the panel perpendicular to a face without crossing a plurality of bearing surfaces in one face of the panel.

The projection walls extending between the bearing surfaces of opposing faces converge to form ridge lines such as lines 40 which represent the intersection lines of the plane surfaces of the walls. However, at certain points in the panel adjacent to the inner corners of the end areas the ridge lines converge to blend into a saddle area 42 of compound curvature as illustrated in the sectional view of Fig. 3. These saddles result from the draw of the dies which form the embossing of the plastic in the manufacture of the panel.

Figure 4:
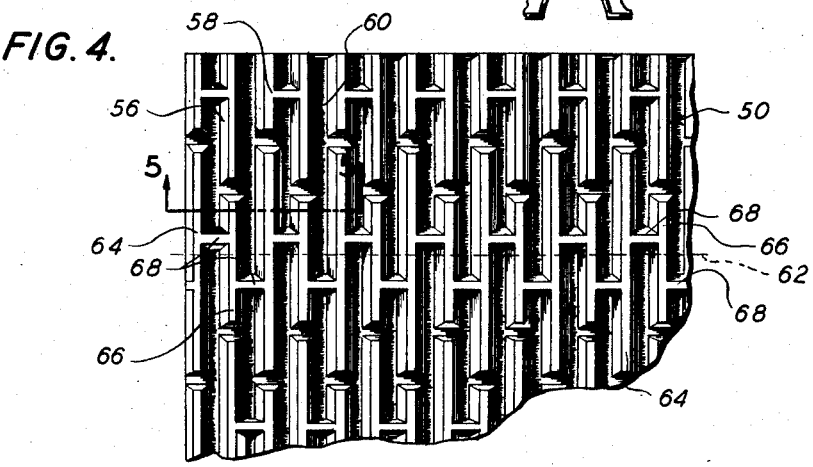
Fig. 4 is a plan view of an embodiment of the invention having a multiplicity of contiguous rectilinear areas forming bearing surfaces.
Figure 5:
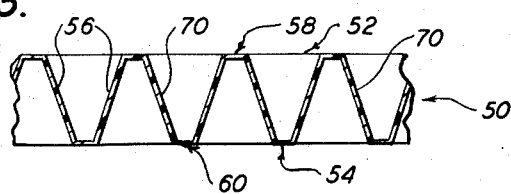
Fig. 5 is a sectional elevation of the panel of Fig. 4 taken along line 5—5 of Fig. 4.

The embodiment of the invention illustrated in Fig. 4 differs from that illustrated in Figs. 1 through 3 because the projections of the panel have bearing surfaces made up of a larger number of rectilinear areas having diverging major axes. The pattern of the bearing surfaces of each of the opposing faces illustrated in Fig. 4 are identical. Each has a series of alternating rectilinear areas arranged symmetrically about a straight line. Panel 50 of Figs. 4 and 5 has opposing faces 52 and 54 which have projections formed by walls 56 and upper and lower bearing surfaces 58, 60 respectively. Each bearing surface has a series of co-planar rectilinear areas arranged symmetrically about a line such as dotted line 62. A plurality of longer rectilinear areas 64 are arranged symmetrically with respect to the imaginary line 62 with their respective major axes perpendicular to the line. A plurality of shorter rectilinear areas 66 are similarly arranged with respect to the line 62 and are arranged along that length of the line alternating with the longer rectilinear area. The longer and shorter areas are connected by short rectilinear areas 68 and whose major axes are perpendicular to the longer and shorter rectilinear areas. Each succeeding connective area extending between the longer and shorter areas is arranged on the opposite side of the line 62. The lower bearing surface 60 is similarly arranged about an imaginary horizontal line drawn in the face 54. This second line is displaced from the line 62 so that, as viewed in Fig. 4, the longer rectilinear areas of the bearing surface 60 extended into the area defined in the upper face by the longer rectilinear area, the short connective rectilinear area and the shorter rectilinear area of bearing surface 58. Each shorter rectilinear area of the lower bearing surface pattern extends into the area defined by the shorter rectilinear areas, the short connective rectilinear areas and the longer rectilinear area of the upper bearing surface. Projection walls such as walls 70 (Fig. 5) extend between the bearing surfaces of the opposing faces of the panel in the manner described for the projection walls of the panel of Fig. 1. The embodiment of the invention of Fig. 4 and Fig. 5 has two degrees of interlock so that any plane passed into the panel perpendicularly to a face will intercept flat bearing surfaces in each face of the panel. For instance, line 62 can represent the edge of a plane passing through the panel and such a plane intercepts a plurality of bearing surfaces in each face. Any plane passed through the panel will show the same result.

Figure 6:
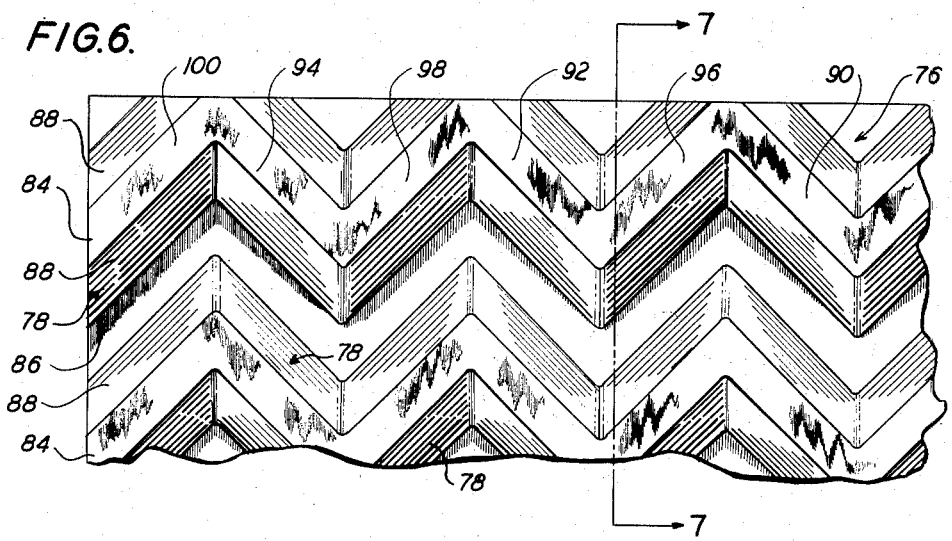
Fig. 6 is a plan view of an embodiment of the panel material of the invention in which the contiguous rectilinear areas of the bearing surfaces constitute a herringbone pattern.
Figure 7:
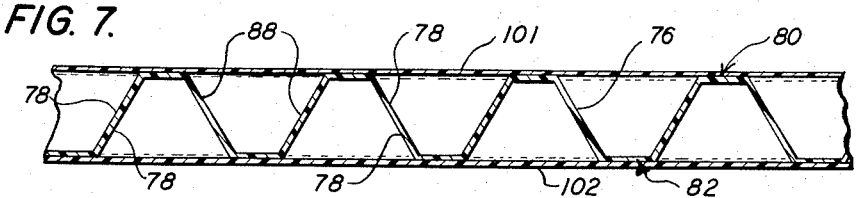
Fig. 7 is a sectional elevation of the panel material of Fig. 6 with skins bonded to it, taken along line 7—7 of Fig. 6.

Figs. 6 and 7 illustrate a further embodiment of the invention in which a panel 76 has projections 78 forming faces 80, 82 which have a plurality of bearing surfaces 84, 86 respectively. The projections have sloping walls 88 which extend between the bearing surfaces of the two faces. Rectilinear areas 90, 92, 94 are mutually parallel and contiguous with rectilinear areas 96, 98, 100 which are mutually parallel also. The major axes of areas 90, 92, 94 are respectively perpendicular to the major axes of the areas 96, 98, 100 so that adjacent contiguous surface areas have diverging major axes. Bearing surfaces 86 are similarly comprised of rectilinear areas having diverging axes and, as viewed in Fig. 6, are displaced from the bearing surfaces 84 to give the appearance of a herringbone pattern. The pattern of the panel of Figs. 6 and 7 is an interlocking one, the V's of the succeeding bearing surfaces of each face being aligned so that no plane can be passed through the panel perpendicular to a bearing surface without intercepting a plurality of flat bearing surfaces in each face. As previously defined, this gives the core of Figs. 6 and 7 two degrees of interlock.

Fig. 7 illustrates a laminated structure comprised of the panel 76 of Fig. 6 used as a core and outer skins 101, 102. This laminated panel may be used structurally as a ceiling or a wall or in any of the many applications utilizing laminated core structures.

Figure 8:
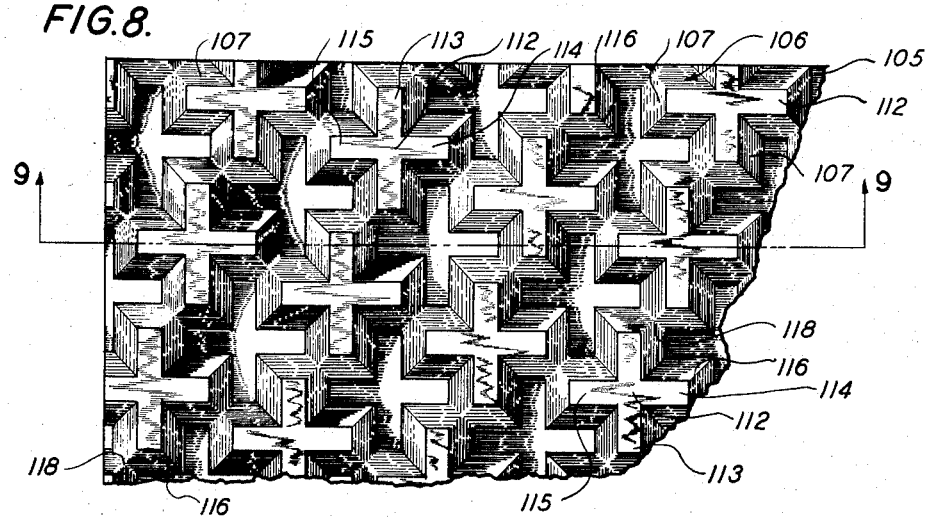
Fig 8 is a plan view of a further embodiment of the invention in which the bearing surfaces of the panel have a pattern of interlocking crosses.
Figure 9:
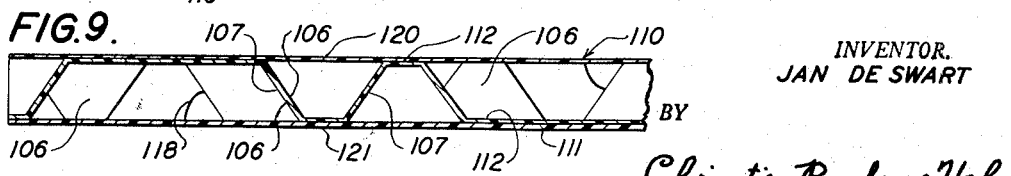
Fig. 9 is a sectional elevation of the panel of Fig. 8 taken along line 9—9 of Fig. 8 and having outer skins bonded to it.

The panel of Figs. 8 and 9 is similar in construction to that of Fig. 1 in that the pattern is formed by three diverging rectilinear areas of the bearing surfaces of the panel. A panel 105 has a plurality of projections 106 with sloping walls 107 extending between upper and lower faces 110, 111 respectively. The projections in each face have bearing surfaces 112 identical in configuration in each face. The bearing surfaces of one face are disposed symmetrically with respect to the four proximal bearing surfaces of the opposing face to form a panel having one degree of interlock. Each bearing surface comprises a first rectilinear area 113 whose major axis extends vertically and second and third rectilinear areas 114, 115 whose major axes diverge from that of the first rectilinear area so that the areas extend horizontally, as viewed in Fig. 8. The second and third rectilinear areas are located symmetrically with respect to the length of the first rectilinear area and each is of such a length that the pattern of the bearing surface is an equal-armed cross. Sloping walls 107 are planar and intersect at each corner of each area to form ridge lines 116. At one corner of the end of each arm of the cross-shaped bearing surface the ridge lines converge to form contoured saddles 118 similar to the saddles described with respect to Fig. 3.

The panel of Fig. 8 is shown in Fig. 9 as the core of a laminated structure with outer skins 120, 121. These skins may be transparent or translucent so that the pattern of the crosses is visible through the skin to form a pleasing decorative wall or ceiling. If both the skins and the core are translucent, many decorative effects can be achieved by various lighting and color combinations in conjunction with the laminated structure described.

Figure 10:
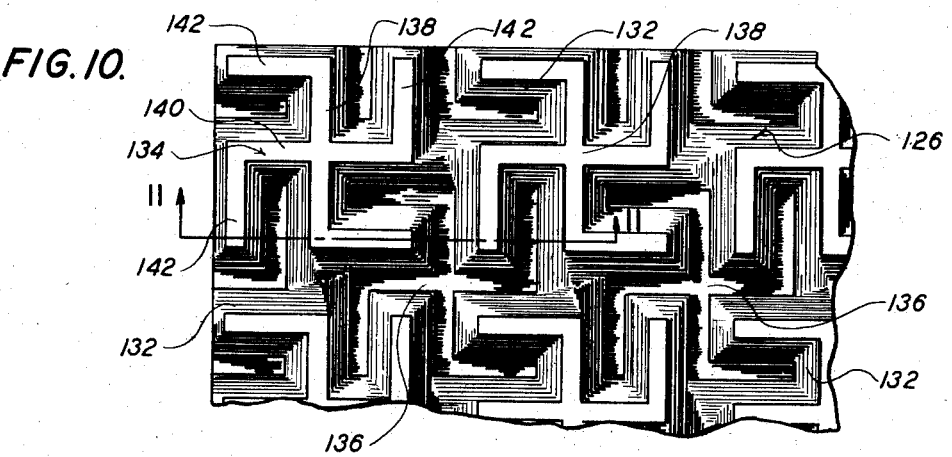
Fig. 10 is a plan view of a panel embodying the invention that has bearing surfaces whose contiguous rectilinear areas form an interlocking swastika pattern.
Figure 11:
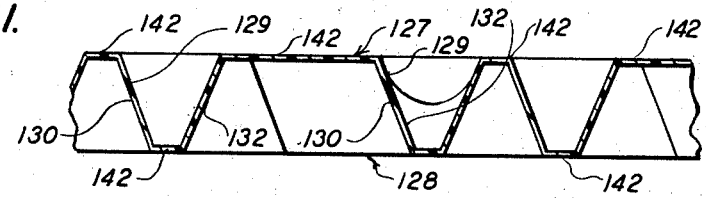
Fig. 11 is a sectional elevation taken along line 11—11 of Fig. 10.

Fig. 10 illustrates a panel 126 having opposing faces 127, 128 comprised of upper and lower projections 129, 130 respectively which have sloping walls 132 extending between upper bearing surfaces 134 of face 127 and lower bearing surfaces 136 of face 128. In this embodiment of the invention the configuration of the bearing surfaces is that of a swastika. Contiguous rectilinear areas 138 and 140 cross at their mid-points to form the central portion of the swastika, and therefore their respective major axes diverge at an angle of 90°. Each of the crossed rectilinear areas has a secondary rectilinear area 142 whose major axis diverges at right angles to the crossed rectilinear area with which it is contiguous.

As viewed in Fig. 10, the secondary rectilinear areas 142 of the lower bearing surfaces 136 extend into the area defined by portions of the crossed rectilinear areas 138, 140 and the proximate secondary rectilinear area 142. This results in a pattern having one degree of interlock. No plane can be passed through the panel perpendicular to a bearing surface without intercepting a plurality of bearing surfaces in a face of the panel.

Figure 12:
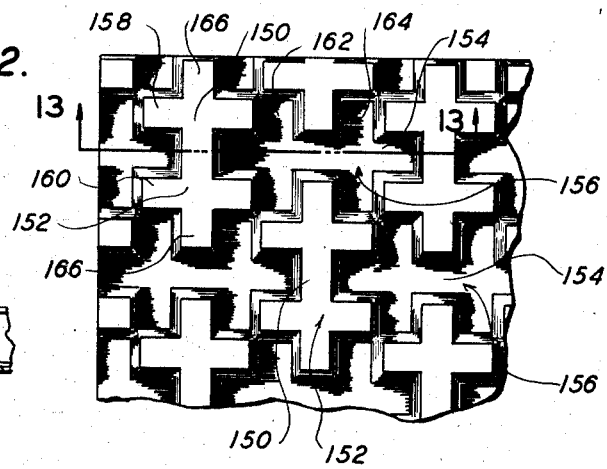
Fig. 12 is a plan view of an embodiment of the invention having an interlocking bearing surface pattern of crosses with two horizontal bars.
Figure 13:
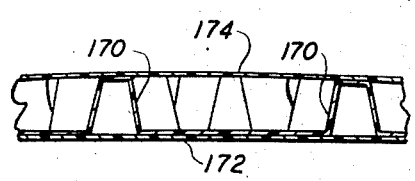
Fig. 13 is a sectional elevation taken along line 13—13 of Fig. 12 and showing outer skins bonded to non-parallel opposing faces of the panel of that figure.
Figure 14:
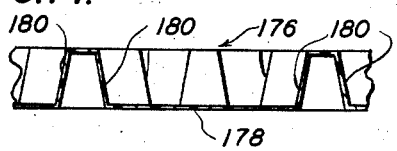
Fig. 14 is a sectional elevation similar to the view of Fig. 13 but illustrating a panel like that of Fig. 12 with parallel opposing faces.

Figs. 12 through 14 illustrate a core embodying the invention in which the pattern of the bearing surfaces of each face of the core have the configuration of a cross of Lorraine. The major axis of the long stem 150 of an upper bearing surface 152 is perpendicular to a major axis of a long stem 154 of a lower bearing surface 156. The cross configuration of each bearing surface is completed by pairs of second and third rectilinear areas 158, 160 and 162, 164 respectively whose major axes are perpendicular to the major axis of the respective long stems of the upper and lower bearing surfaces.

The protruding extreme ends 166 of the long stem of each bearing surface are located between the extending short areas of the proximate bearing surfaces of the opposite face so that a core is formed having one degree of interlock.

The core of Fig. 12 as well as any of the panels heretofore illustrated may be formed with dies of varying depths of draw so that the faces of the core are non-parallel. A laminated structure using such a core is illustrated in section in Fig. 13 in which the walls 170 of the projections vary in extent between the opposing faces of the core so that a core having a contoured outer face is formed. The laminated structure of Fig. 13 has a planar lower skin 172 and a contoured upper outer skin 174. Such a laminated structural member is useful in forming air foils in the aircraft industry and embodies one method of forming a laminated beam to span a large open space.

Fig. 14 is a section similar to Fig. 13, but skins are not bonded to the core and an upper face 176 of the core is parallel to a lower face 178. Sloping walls 180, extending between the bearing surfaces of the opposing faces are of the same extent. The pattern of the faces is identical to that of the core of Figs. 12 and 13, so that both the embodiments of Figs. 13 and 14 have one degree of interlock.

Figure 15:
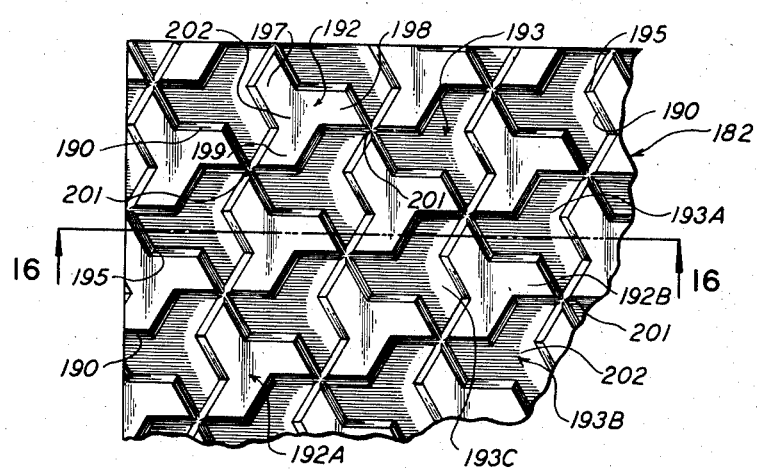
Fig. 15 is a plan view of a further embodiment of the invention in which the pattern of the bearing surfaces has three diverging rectilinear areas.
Figure 16:
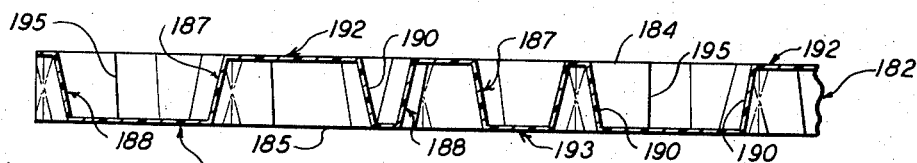
Fig. 16 is a sectional elevation taken along line 16—16 of Fig. 15.

Figs. 15 and 16 illustrate a panel 182 embossed from a thin sheet of plastic. The panel has two degrees of interlock. An upper face 184 and an opposing lower face 185 have identical patterns of embossing. Each face is composed of a plurality of upper projections 187 and lower projections 188. The projections have sloping walls 190 extending between upper bearing surfaces 192 and the lower bearing surfaces 193 of the projections of the opposing faces 184 and 185 respectively. The sloping walls are planar and adjacent walls of each projection intersect to form ridge lines as at 195.

Each bearing surface comprises three contiguous, coplanar rectilinear areas, 197, 198, 199. The ridge lines of the outermost corner of each of the component rectilinear areas converge with the ridge lines of the similar corners of the five proximal rectilinear areas of the bearing surfaces in both faces. Convergence of the ridge lines of the outer corners results in a blending of the ridge lines into a contoured saddle area 201, similar to that shown and described previously with reference to Fig. 3.

The three rectilinear areas of each bearing surface diverge from a central region 202 of the bearing surface. Each of the rectilinear areas is an irregular five-sided figure whose major axis diverges from the major axes of the adjacent areas by an equal amount. The dotted lines in bearing surface 192A define the theoretical contiguous borders of the rectilinear areas.

Each bearing surface of one face is disposed symmetrically between three proximal projections of the opposite face. For instance, in Fig. 15 bearing surface 192B of upper face 184 is disposed symmetrically between lower bearing surfaces 193A, 193B, 193C of lower face 185. The panel pattern defined by the arrangement of the contiguous rectilinear areas of each bearing surface combined with the orientation of each bearing surface of one face with respect to the proximal bearing surfaces of the opposite face is an interlocking pattern in which no plane can be passed through the core perpendicular to a face without intercepting a plurality of bearing surfaces in each face of the panel.

As is true for each of the previously described panels of the invention, the panel of Figs. 15 and 16 is strong in compression, has an interlocking pattern with no inherent bend lines and has large areas of bonding surface in each face of the panel.

Like all of the embodiments of the invention, the panel of Figs. 15 and 16 can be used as a self supporting panel restrained only at one or more of its edges or it can be provided with one or two bonded outer skins to form a laminated structure or panel of lightweight and sufficient strength to serve as a structural member. The inherent rigidity of the panels made in accordance with the invention makes possible laminated panels comprising a core bonded to a single skin. Such a panel, having one face of the core exposed is not only decorative because of the visible pattern of the core, but has a high degree of sound dampening due to the multiplicity of diffusing facets of the core.

The decorative versatility of the panel material of the invention is practically unlimited because of the myriad geometric arrangements of the contiguous rectilinear areas of the bearing surfaces within the broad concept of the invention.

I claim:

1. A laminated structural panel comprising a thin sheet core embossed to form spaced opposed faces, each face comprising a multiplicity of projections, the projections each having a flat bearing surface comprising at least two contiguous co-planar rectilinear areas having divergent major axes, the bearing surfaces being evenly distributed in each face of the embossed sheet, the opposite spaced faces having identical bearing surface patterns with the pattern in one face being laterally off-set with respect to the pattern in the other face with the patterns in the two faces mutually interlocking so that any plane passing through the core perpendicular to a face intercepts more than one bearing surface in each face, and a skin bonded to the bearing surfaces of each face of the core so that the skin and bearing surfaces are bonded together to form a multiplicity of rectilinear joints of identical shape and area on opposite sides of the core.

2. A panel according to claim 1 in which the core is made of a plastic resin.

3. A panel according to claim 1 in which the core is made of polyethylene plastic.

4. A panel comprising a thin sheet core embossed to form spaced opposed faces, each face comprising a multiplicity of projections, the projections each having a flat bearing surface comprising at least two contiguous co-planar rectilinear areas having divergent major axes, the bearing surfaces being evenly distributed in each face of the embossed sheet, the opposite spaced faces having identical bearing surface patterns with the pattern in one face being laterally off-set with respect to the pattern in the other face, with the patterns in the two faces mutually interlocking so that any plane passing through the core perpendicular to a face intercepts more than one rectilinear bearing surface in each face.

References Cited in the file of this patent

UNITED STATES PATENTS

| 1,000,694 | Schaefer et al. | Aug. 15, 1911 |
| 1,965,265 | Spohn | July 3, 1934 |
| 2,481,046 | Scurlock | Sept. 6, 1949 |
| 2,652,878 | Gerard | Dec. 22, 1953 |
| 2,660,757 | Smith et al. | Dec. 1, 1953 |
| 2,699,599 | Potchen | Jan. 18, 1955 |
| 2,738,297 | Pfistershammer | Mar. 13, 1956 |

FOREIGN PATENTS

| 11,851 | Denmark | Feb. 12, 1909 |